July 2, 1957
J. A. POTTER
2,798,199
RESISTANCE TESTING MACHINE
Filed April 19, 1954
10 Sheets-Sheet 1
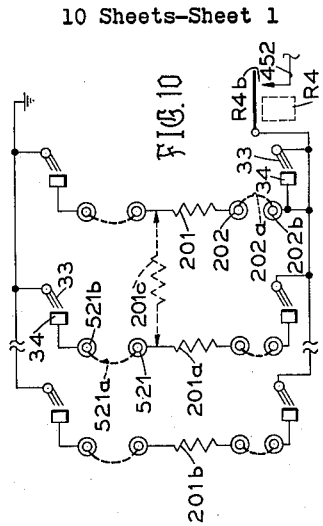
FIG. 10
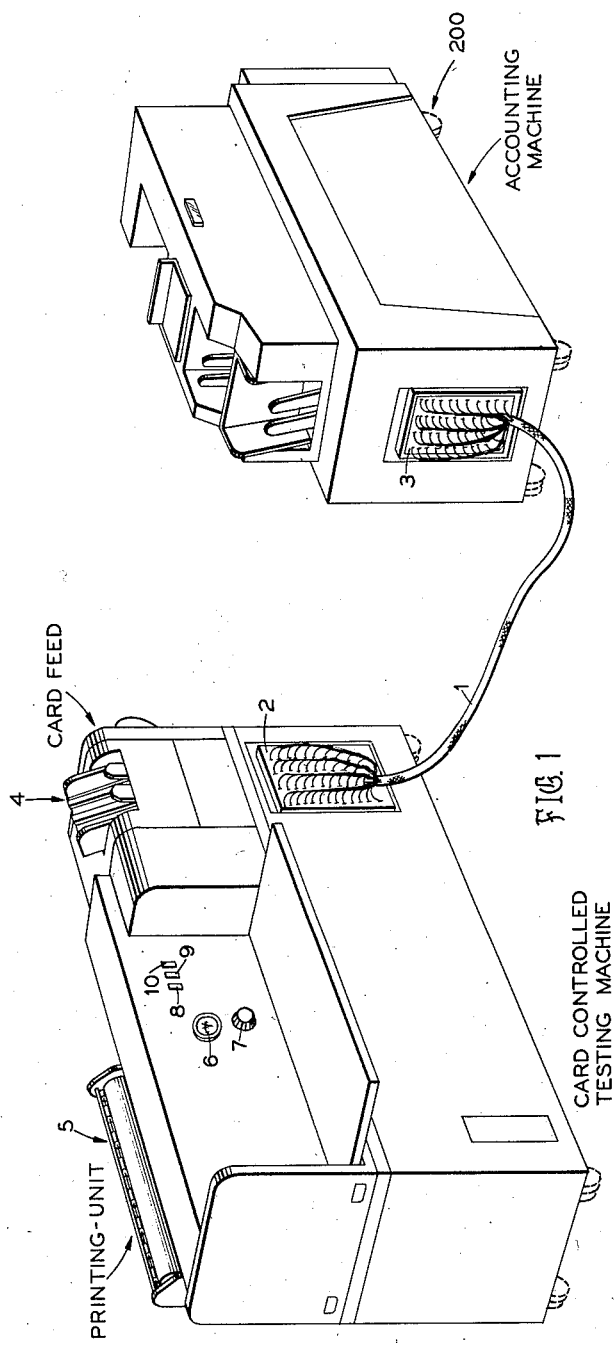
FIG. 1
FIG. 7
| CODE | RES. RANGE | K | EP | $E_N$ | X | S | RELAY | Y | Z |
|---|---|---|---|---|---|---|---|---|---|
| 5 | 5–100 | 5 | 175 | –175 | $10^4$ | 2000 | R20 | | |
| 4 | 1MEG–10MEG. | .1 | 175 | –270 | $10^8$ | $10^8$ | R21 | | |
| 3 | 10K–1MEG. | 1 | 175 | –270 | $10^6$ | $10^6$ | R22 | | |
| 2 | 100–10K | 10 | 175 | –175 | $10^5$ | $10^4$ | R23 | 5:7908M | 61.340M |
| 1 | 0–5 | 2000 | 175 | –6 | $10^4$ | 5 | R24 | | |
*INVENTOR.*
JAMES A. POTTER
BY *Geoffrey Knight*
ATTORNEY July 2, 1957 — J. A. POTTER — 2,798,199
RESISTANCE TESTING MACHINE
Filed April 19, 1954 — 10 Sheets-Sheet 2

*INVENTOR.*
JAMES A. POTTER
BY Geoffrey Knight
ATTORNEY

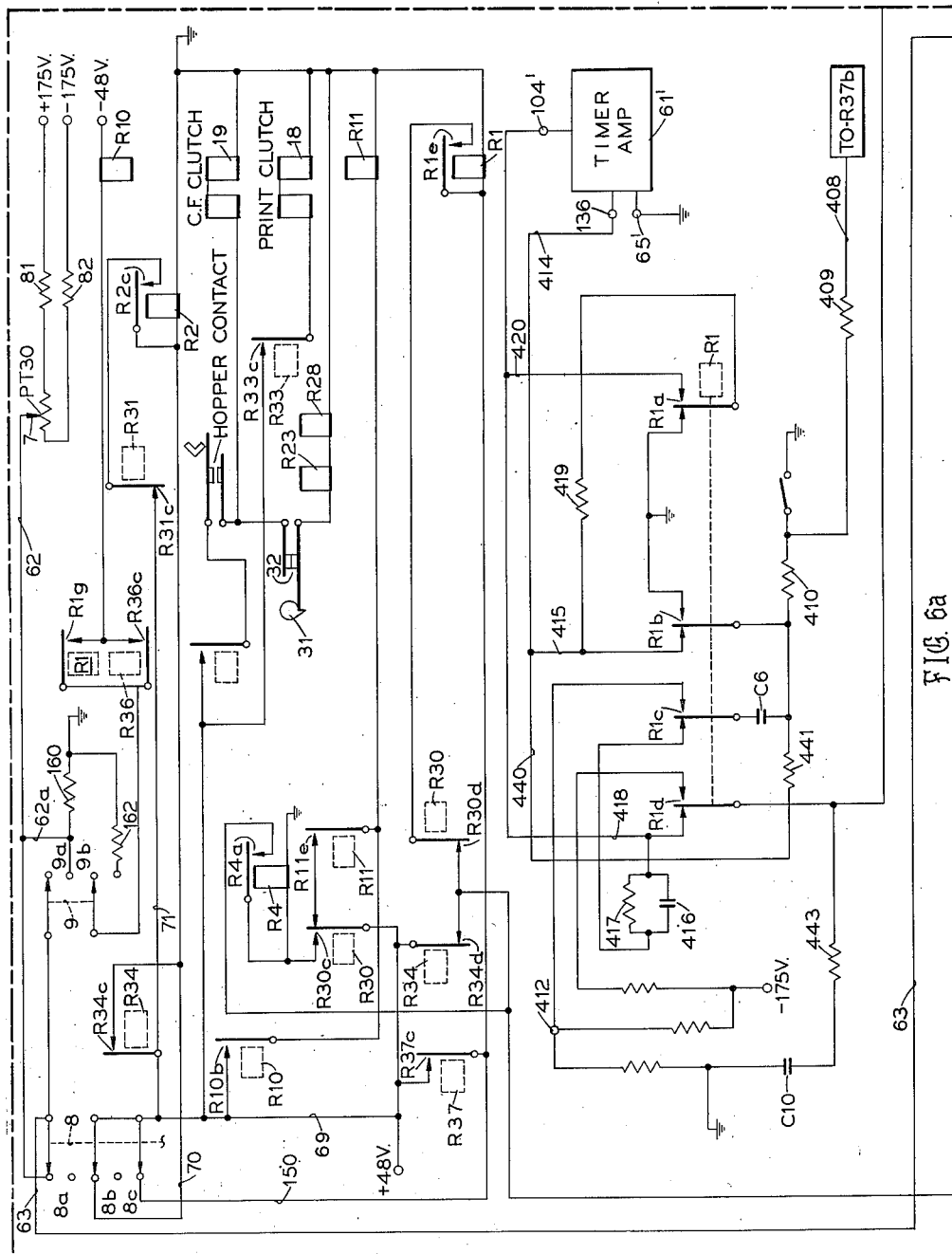

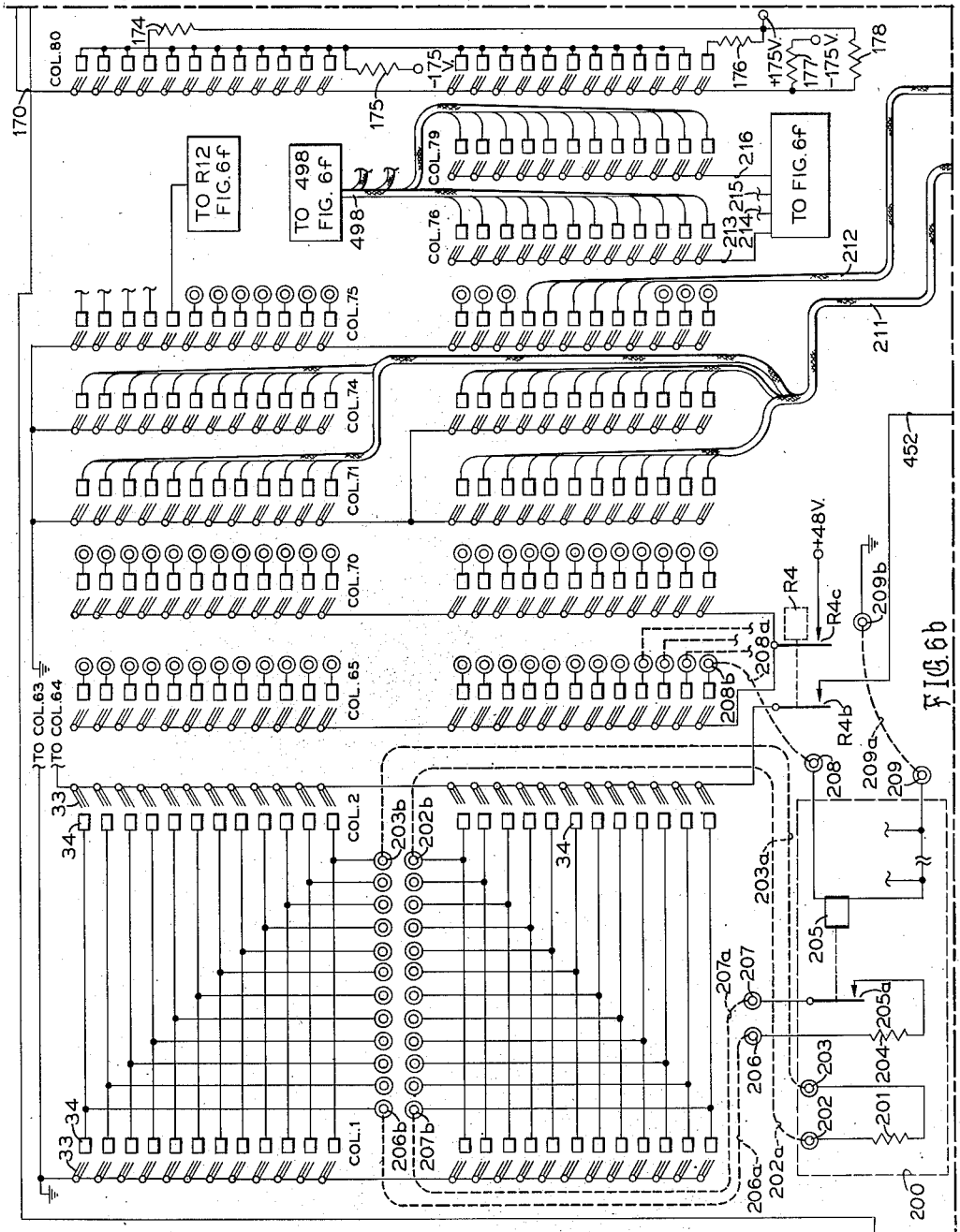

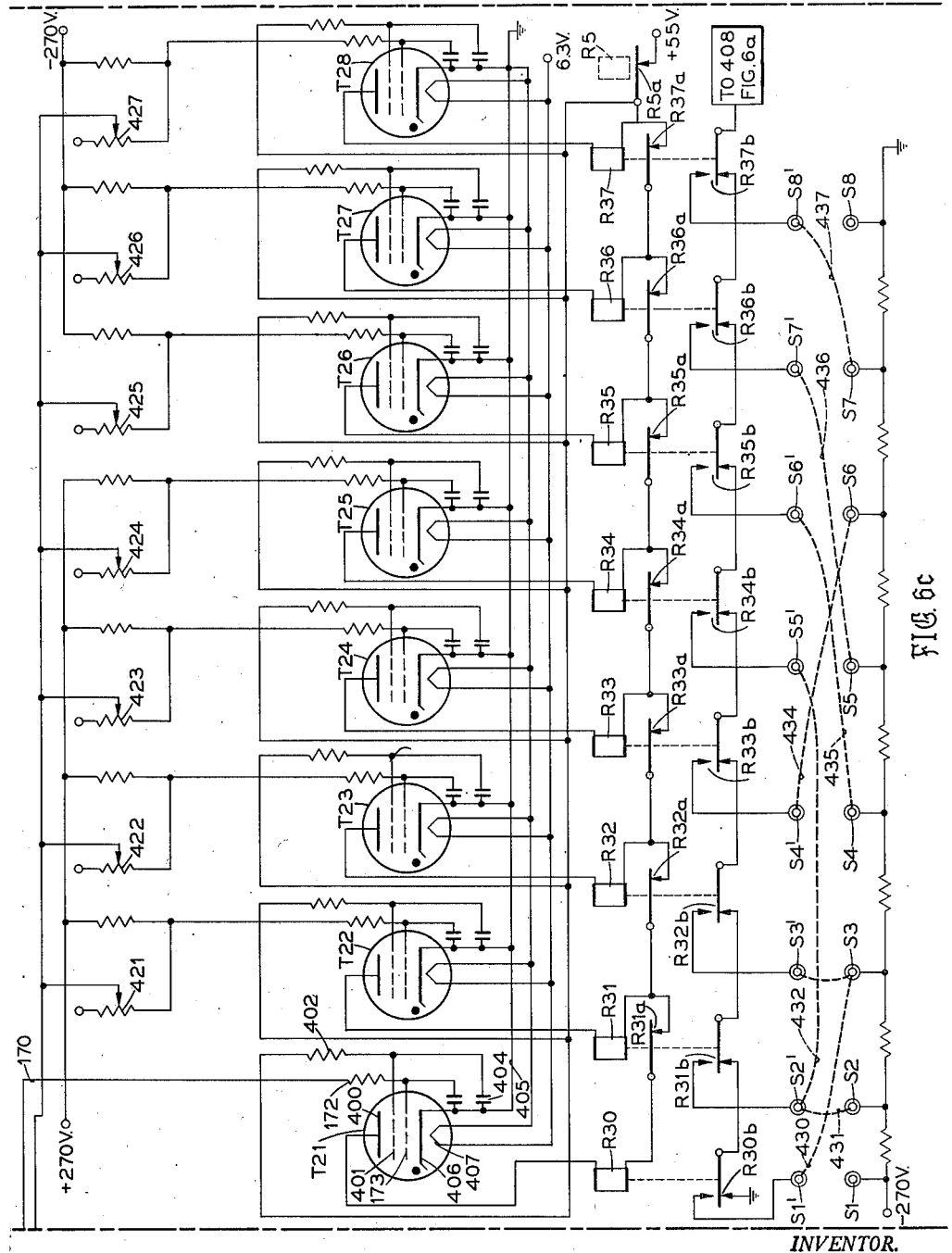

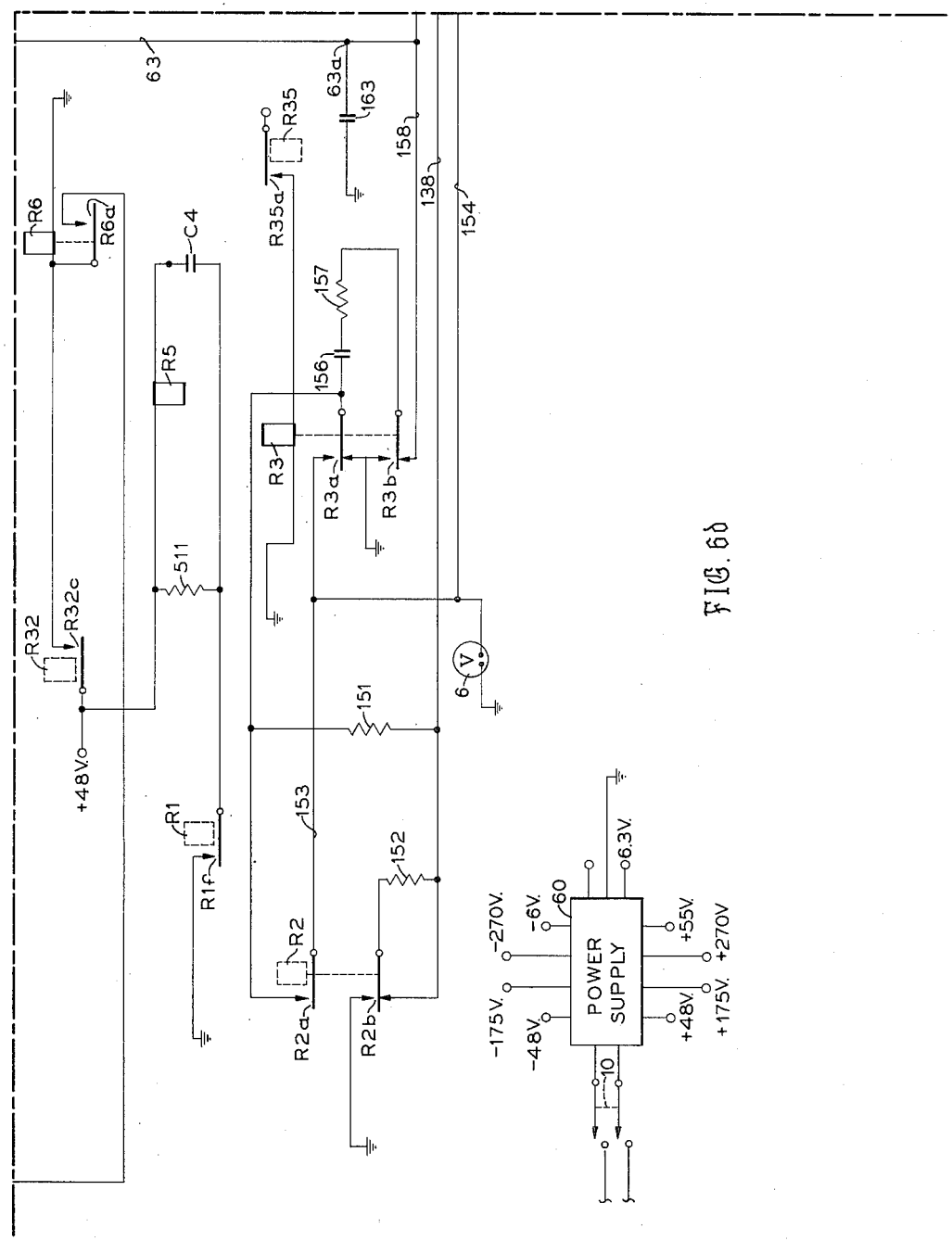

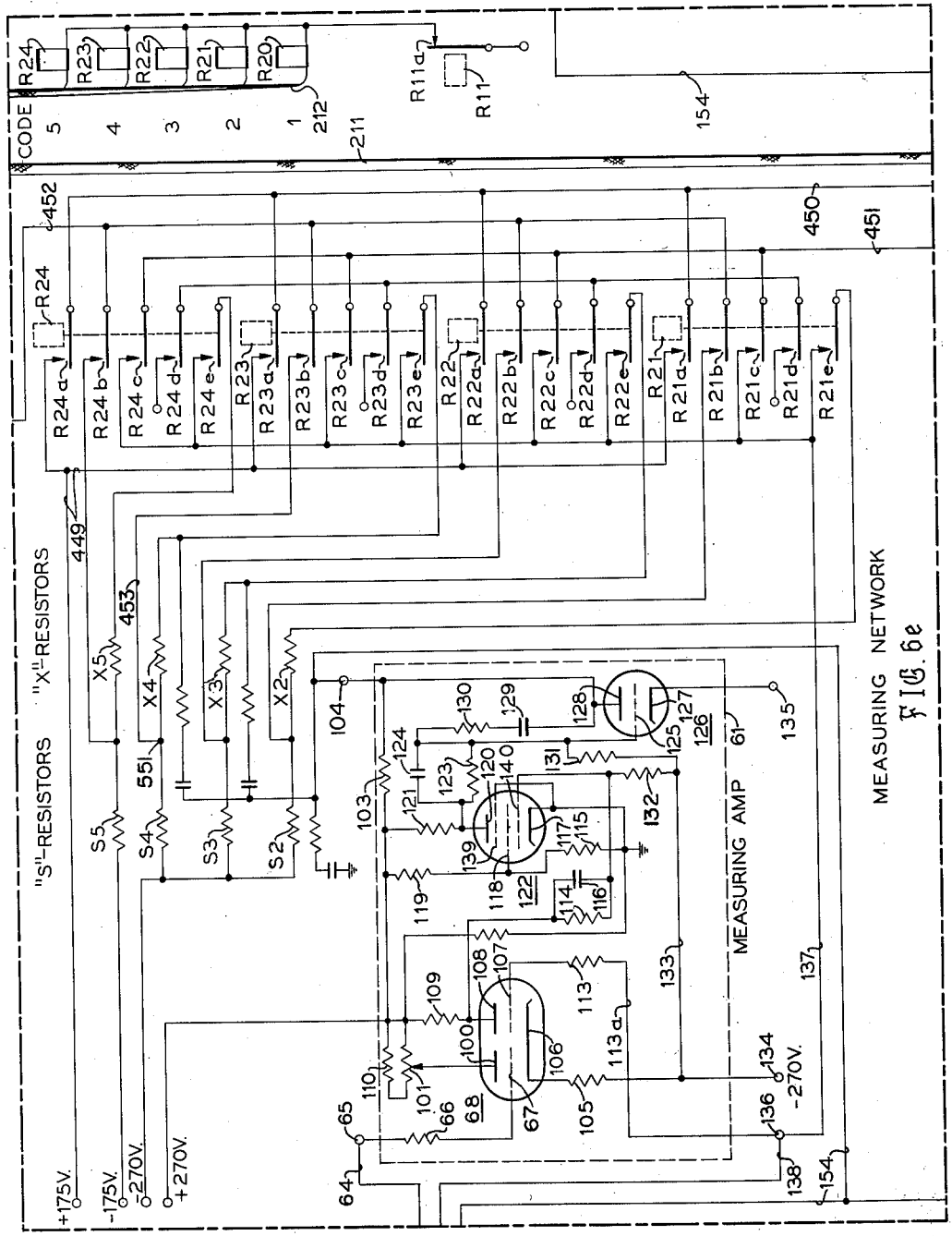

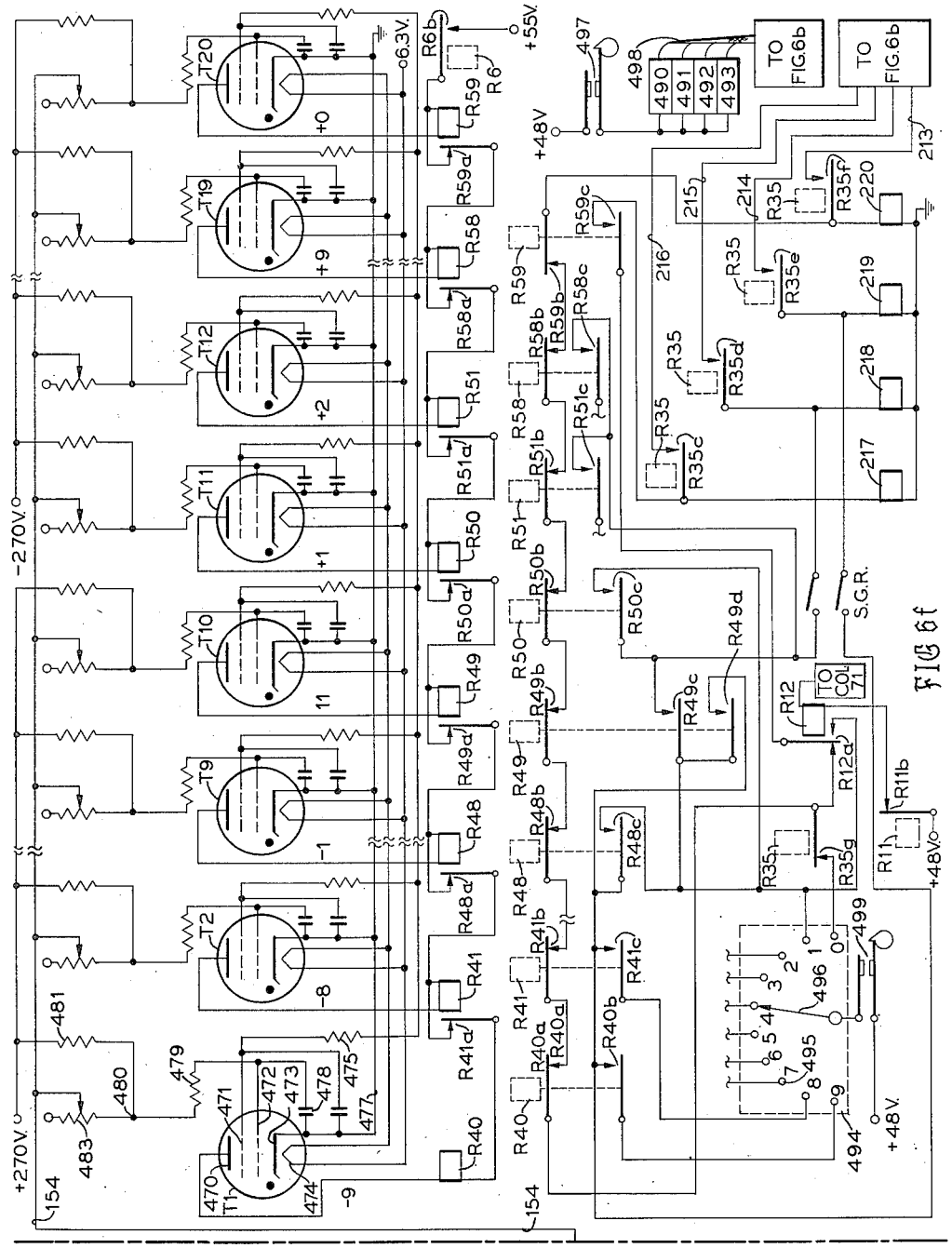

July 2, 1957　　　　J. A. POTTER　　　　2,798,199
RESISTANCE TESTING MACHINE
Filed April 19, 1954　　　　　　　　　　　10 Sheets-Sheet 9
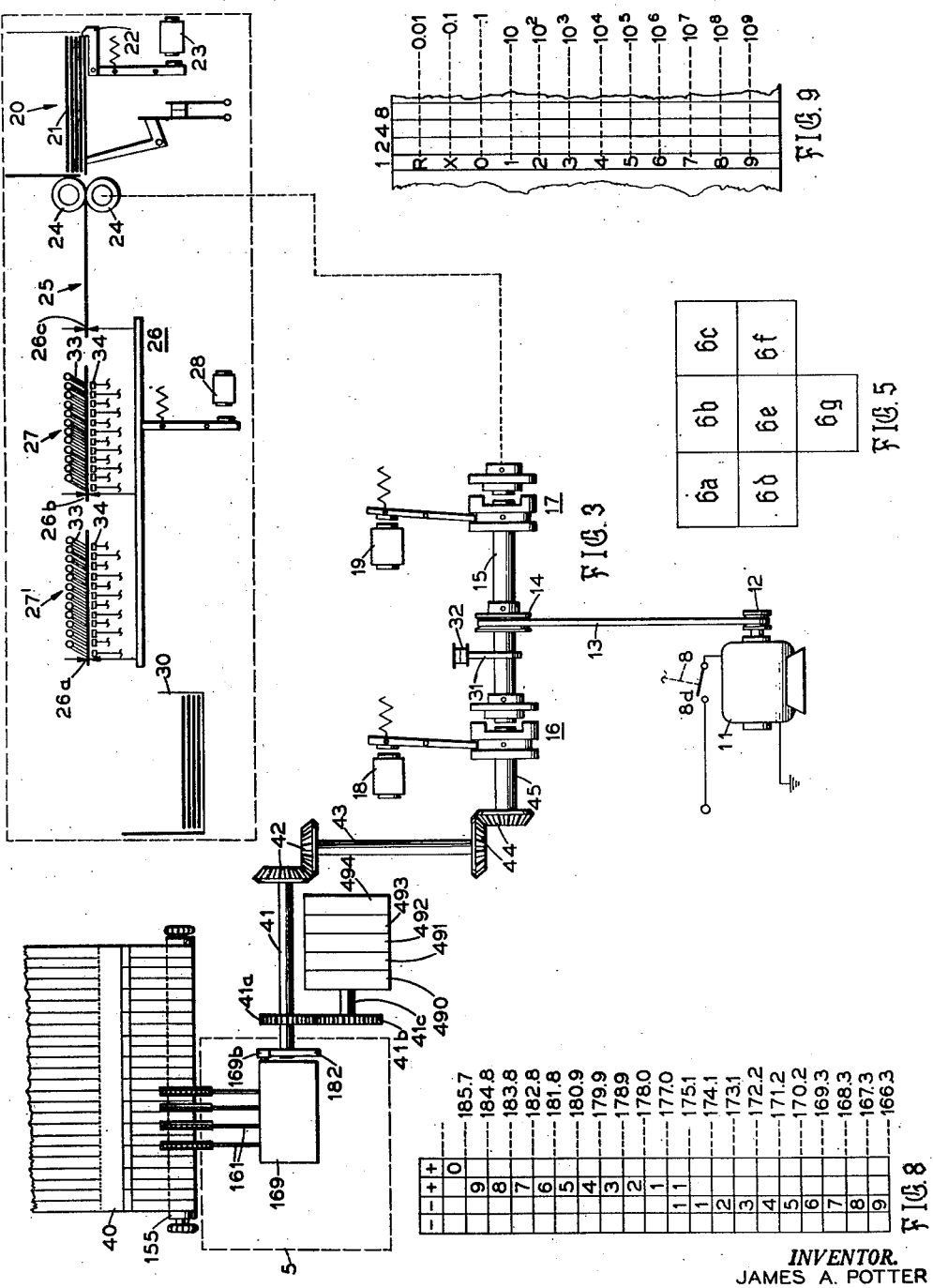
INVENTOR.
JAMES A. POTTER
BY Geoffrey Knight
ATTORNEY

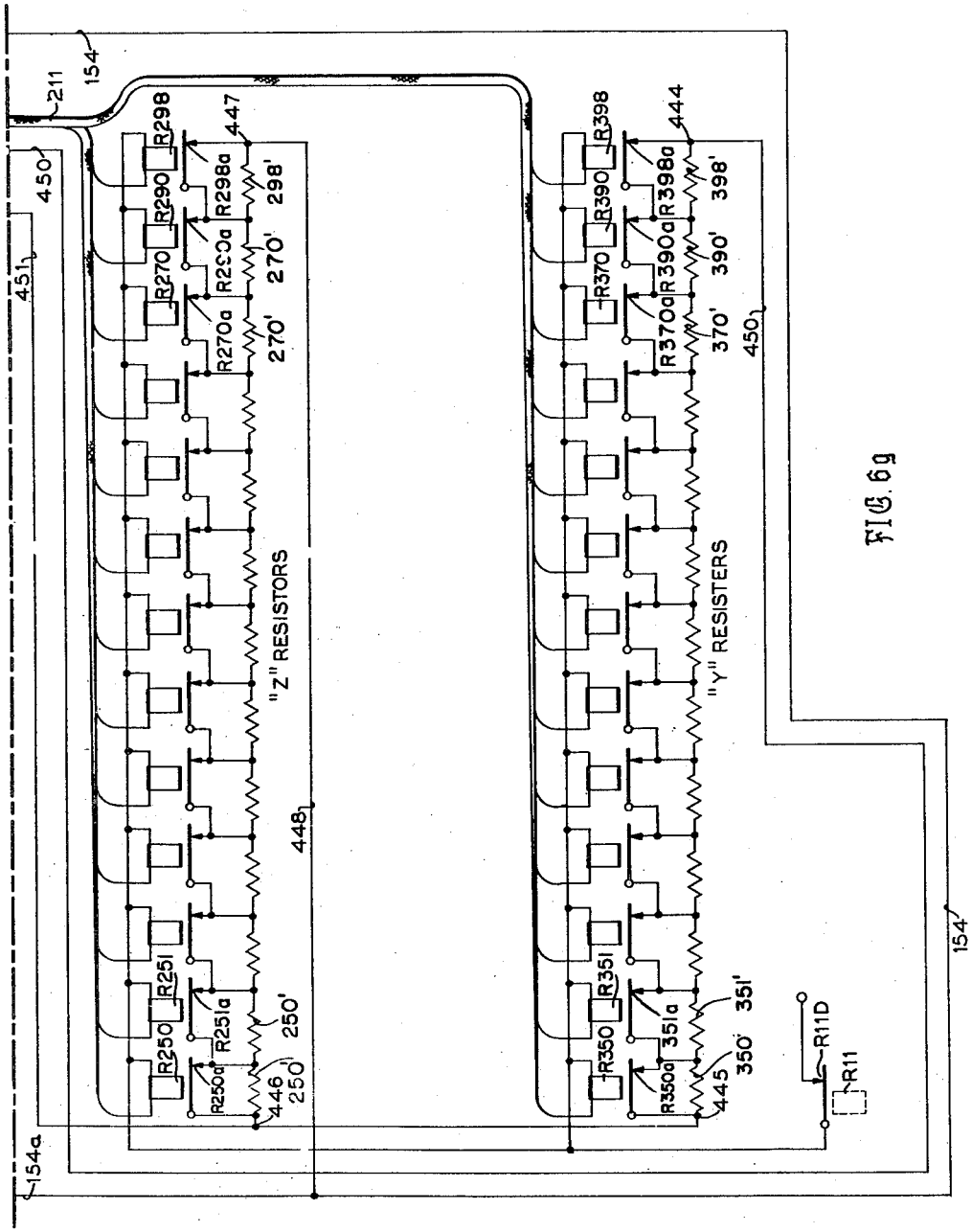

United States Patent Office

2,798,199
Patented July 2, 1957

2,798,199

RESISTANCE TESTING MACHINE

James A. Potter, Binghamton, N. Y., assignor to International Business Machines Corporation, New York, N. Y., a corporation of New York Application April 19, 1954, Serial No. 424,016

12 Claims. (Cl. 324—62)

This invention relates to a testing machine and more particularly to a record controlled testing machine adapted to measure and manifest in rapid succession the measured resistance value of each of a large number of circuits, for example, all of the circuits in a large scale electric accounting machine.

The testing machine is capable of providing a normalized output for a wide variety of circuits to be tested.

In a preferred embodiment preassigned values of resistance for each circuit to be tested are used to compute the resistance values of a resistor network to be combined with the test circuit in such a way that whenever a test circuit is applied to the combined network it yields a digital output applicable to every one of the circuits to be tested.

In its preferred embodiment the testing machine in general comprises a card feed unit provided with sensing means, a control panel whereby the electrical connections are established between the testing machine and the machine under test, the measuring network including a D. C. summing amplifier, a digital voltmeter which translates the output of the measuring network in terms of digit values, a recording unit, and a timer for coordinating the activities of feeding, measuring and recording.

In accordance with the preferred embodiment, there is provided a pair of cards for each circuit to be tested in the accounting machine. The cards are placed in the feed of the testing machine controlled to feed a pair of cards for each feed operation. A test intiating circuit in the feed starts the activities of the timer which causes the measuring network to become effective to measure the resistance of a particular circuit in the accounting machine, selected in accordance with the data sensed in the cards. The output of the measuring circuit is fed into a digital voltmeter which is capable of translating the measured output into digital form. The latter, in turn, is fed into a printing mechanism which provides a printed report of the test.

Each test result within tolerance is indicated either as a positive or negative digit value 1 through 9 depending upon whether the measured resistance of the circuit under test is either above or below its precalculated value. The measured resistance, when thus expressed in digital form, provides a measure of the quality of the circuit with respect to its precalculated value. A zero value is used to indicate a circuit measurement which is beyond the tolerance range and is an indication of a defective circuit.

The testing and recording proceed uninterruptedly in order to provide a report as quickly as possible showing in digital form the quality of each circuit in the machine under test. By virtue of such a test report quality controls may be set at any desired quality level and may prove to be an invaluable tool in determining the most efficient standards in manufacturing control.

The main object of the present invention is the provision of an automatic record controlled testing machine which can be quickly connected with relative ease to an array of terminated circuits, such as are found in a large scale accounting machine, for measuring the resistance value of each terminated circuit therein and to record the results thereof in digital form.

Another object resides in the provision of an automatic record controlled testing machine capable of providing a normalized output for a wide range of selected measured resistance inputs.

Yet another object resides in the provision of a machine of the class described having timer means provided with pluggable controls whereby a variety of functions may be controlled, each having a time period which may be varied in accordance with the manner in which the pluggable controls are set.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a perspective view of the card controlled testing machine shown connected to a card controlled accounting machine.

Figs. 2a and 2b together show a pair of cards each divided into various columnar areas wherein appropriate data relating to a circuit is recorded.

Fig. 3 is a schematic arrangement of the machine showing the feed, the printing unit, the feed clutch, the printing clutch and drive means.

Fig. 5 shows the relative arrangement of the Figs. 6a through 6g constituting the wiring diagram of the card controlled testing machine.

Fig. 7 is a chart showing five code groups of resistance ranges including corresponding values of resistances and voltages.

Fig. 8 is a chart showing, as an illustrative example, the digit values corresponding to a set of measured resistance values of a circuit whose precalculated value is 176.5 ohms having a + or − tolerance of 5.5 percent.

Fig. 9 shows a set of multiplier values; namely, 1, 2, 4 and 8 each assigned to a respective column 71 through 74, and a column of resistance values each assigned to an associated index point position of column 71.

Fig. 10 is a schematic circuit showing in part connections related to insulation testing of a selected circuit.

First in order, in an explanation of the cards and the various fields thereon wherein are punched holes for selecting a particular circuit in the accounting machine for test and the various coded data associated with that particular circuit.

*The cards*

Figure 2A:
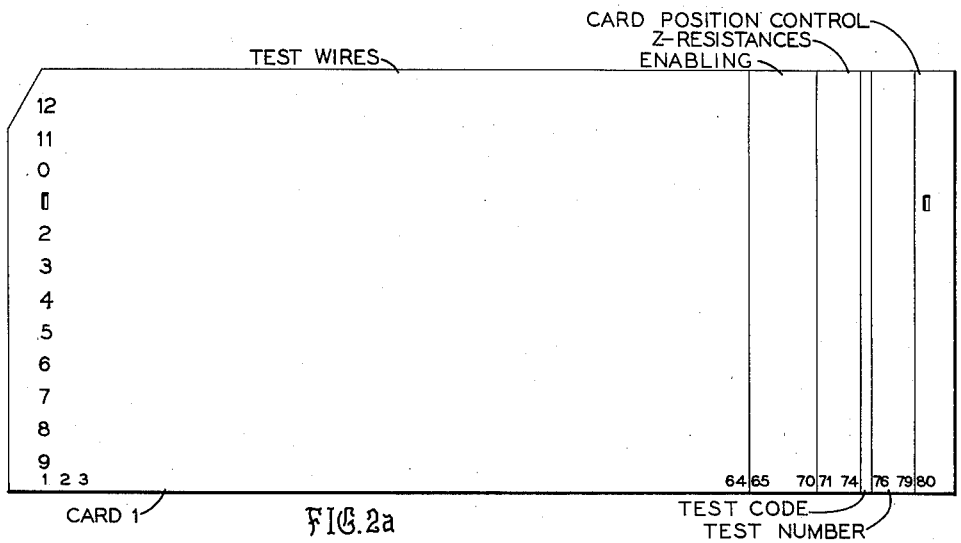
Figure 2B:
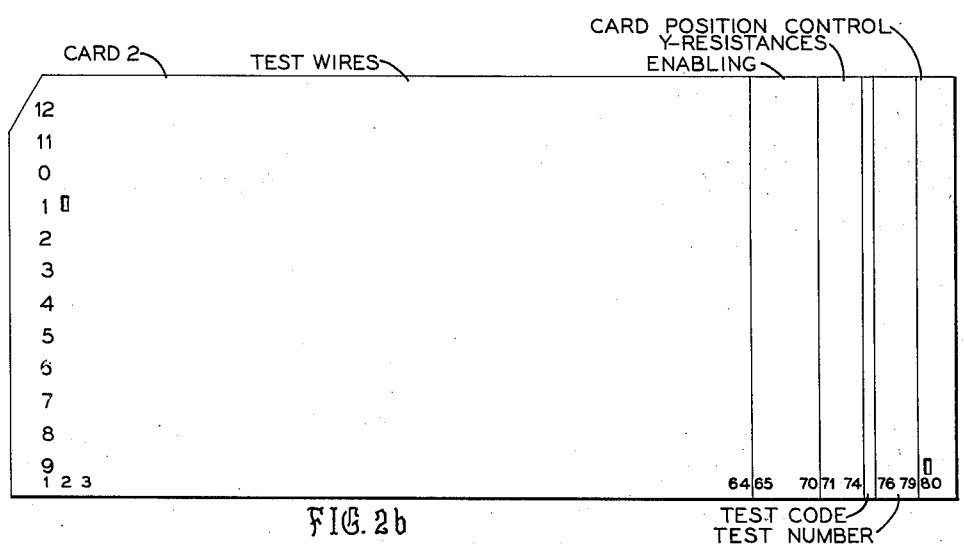

Referring to Figs. 2a and 2b there are shown two well-known IBM tabulating cards each of which is divided into a familiar pattern consisting of 80 vertical columns and 12 horizontal rows which provide 960 possible index positions. The first 64 columns of each card are used for selecting the various circuits in the accounting machine for test. In accordance with the preferred arrangement, a particular pair of punched holes is used to designate a particular circuit in the accounting machine. For example, a one hole in column 1 of card 1 and a one hole in a column 2 of a card 2. In view of this arrangement it may be appreciated that a capacity of 64 columns enables the selection of 768 circuits in the accounting machine.

Columns 65 through 70 are employed for enabling controls which are used for the purpose of closing normally open contacts which may appear in a circuit under test. In this case a single hole is used to energize the relay controlling the normally open point in question. Columns 65 through 70 inclusive provide a capacity of 72 enabling control circuits.

In column 75, card 2, a particular one of a group of five codes is recorded. Each code selects a set of appropriate X and S values associated with a given range of precalculated resistance values. For example, code 3 is assigned to cover a prescribed range of resistance values from 10,000 ohms to a megohm. The codes 1 through 5 and their respective resistance ranges are further shown in the chart of Fig. 7.

In columns 71 through 74 the resistance values Y and Z are coded in a manner to be described. The Y value appears in card 2 while the Z value appears in card 1. For each circuit of a given resistance value and tolerance limit there are thus provided corresponding Y and Z values of resistance. These Y and Z values along with associated X and S values are all combined, along with the terminated circuit selected for test, in the measuring network wherein a resistance measurement is effected in a manner to be explained.

Each terminated circuit selected for test must have an appropriate identification number whereby the test result may be identified. Accordingly columns 76 through 79 are set aside for the circuit identification number (test number).

Column 80 is employed as a means for determining that the cards of each pair are in proper sequence. To this end card 2 is identified by a one hole in column 80 and card 1 is identified by a nine hole in column 80.

The testing machine in general

In Fig. 1 the card controlled testing machine is shown connected by means of a cable 1 to the accounting machine which is to be tested in the manner described. The latter is a machine of the type shown in the patent to D. W. Rubidge, No. 2,379,828, issued July 3, 1945. The card controlled testing machine is provided with a control panel 2 having an arrangement similar to a control panel 3 employed on the said accounting machine. The card feed unit and the print unit are respectively identified as 4 and 5. A voltmeter 6 provides an indication of the output of the measuring amplifier located within the testing machine. A knob 7 forms part of a potentiometer which may be adjusted to provide a zero output of the amplifier. The machine is provided with operating control switches 8 and 9, the former is a single throw 4-pole switch having a standby and run-in setting while the latter is a double pole double throw switch and is called the feed control switch. Switch 10 is the main line switch which supplies power to the machine.

The structure of the card controlled testing machine is schematically disclosed in Fig. 3. Here we find a drive motor 11 connected by means of a pulley 12 and a belt 13 to a drive pulley 14 secured to a drive shaft 15 having a print clutch 16 on one end thereof and a feed clutch 17 on the opposite end thereof. The print clutch 16 is under the control of a print clutch magnet 18 energized as a preliminary to a printing operation. The feed clutch 17 is under control of a feed clutch magnet 19 energized as a preliminary to a feeding operation.

The feed unit 4, also schematically shown, is of the type shown and described in the patent to E. J. Rabenda, No. 2,569,829. In said patent the feed is best shown in Fig. 3 and fully described in the specification beginning on page 8.

Briefly, the feed unit as represented in Fig. 3 of the instant application has a supply hopper 20 adapted to hold a deck of cards 21 each of which is fed singly into the feed by means of a conventional picker knife assembly 22 operated in response to the energization of a picker knife control magnet 23. Each card is fed into the bight of a pair of feed rolls 24 which in turn advance the card into a presensing station 25. Upon its advancement into said presensing station the leading edge of the card is gripped by a card gripping mechanism 26 adapted with card grippers which are normally open to accept the card and which close thereafter when the card is advanced into the first reading station 27. These grippers are represented by three pairs of opposed arrows indicated respectively as 26a, 26b and 26c. Upon energization of a gripper control magnet 28 the gripper mechanism is advanced to feed the card into the first reading station 27. The feed is controlled, in a manner to be later described under circuit description, two cards for each feeding operation. At the end of each card feed operation, card 2 assumes its position in the second read station 27' while card 1 assumes its position in the first read station. Reference numeral 30 represents the stacker into which the cards are fed after emerging from the feed.

As further seen in Fig. 3 of said Rabenda patent, the reading stations therein are each provided with a plurality of current carrying members 161, one for each card column, and each carrying a plurality of angularly positioned analyzing brushes 162 which encounter the perforations in the card and pass therethrough to complete electrical circuits to segment extensions 163 of segment contact member 164. The tester does not have any rotating "readout" brushes. Returning to Fig. 3 of the instant application the analyzing structure above outlined is shown in simplified form. The analyzing brushes are referenced as 33 and are disposed to make electrical contact with segment contact members 34 each of which is wired to an associated plug socket located on the control panel of the testing machine. The latter arrangement represents a departure from the manner in which said segment members are connected in said Rabenda patent.

Printing mechanism

The printing unit 5 shown in Fig. 3 of the instant application is of the type shown and described in the patent to C. D. Lake et al., No. 2,658,682, issued November 10, 1953. In said patent the printing means is shown in Figs. 13, 14 and 15 described in the specifications beginning with page 8. As described therein a set of 4 type bars 161 are connected to and vertically reciprocated by means of a frame 169 carrying a roller 169b adapted for cooperation with a cam 182. Returning to Fig. 3 of the instant application we find the same elements and reference numbers shown enclosed within the printing unit 5. The type bars 161 are further adapted in the usual manner to coact with a printing platen 155 which is partially encircled by a sheet of paper 40 on which the test results will be printed. The cam 182 is secured to a shaft 41 in turn connected to the print clutch 16 by means of a pair of beveled gears 42, shaft 43, a pair of beveled gears 44 and shaft 45 connected to the print clutch 16. Also attached to said shaft 41 is a gear 41a meshed with another gear 41b which is attached to a shaft 41c. The latter is arranged to drive a plurality of well-known emitter devices respectively 490 through 494. The operations of the print clutch accordingly initiate a printing cycle whereby the test results are printed on the test report 40.

Circuit description

Figure 4:
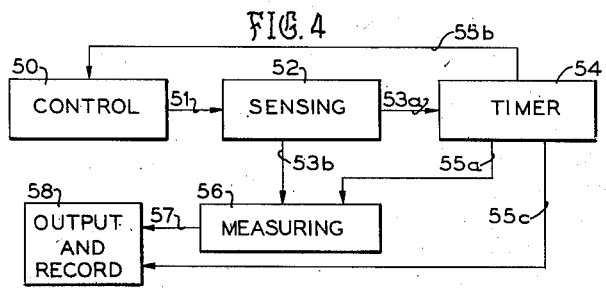
Fig. 4 is a block diagram showing how the various activities of the card controlled testing machine are interrelated.

Before presenting a detailed explanation of this circuit it might be well to explain the general pattern of circuit operation as set forth in block diagram form shown in Fig. 4. In Fig. 4 operations begin with Control, block 50. Control is concerned with circuits dealing with the starting of the testing machine and the feeding of the cards therethrough. From block 50 a line 51 extends to Sensing, block 52, which is concerned with the analysis of the cards fed into reading stations of the feed. In accordance with the analysis of the card a signal by way of line 53a extends into a Timer, block 54. Other signals are fed by way of line 53b to Measuring, block 56. The Timer controls activities of feeding by way of line 55b, initiates the measuring of the test by way of line 55a and controls printing of the test result by way of line 55c. In accordance with the analysis of the cards a particular circuit in the accounting machine is selected for test, in addition the various resistance values; namely X, S, Y and Z and voltage values are also selected and combined in the measuring circuit which provides a voltage output by way of line 57 to Output and Record, block 58. The latter includes a digital voltmeter whereby the output voltage fed therein is converted to digital form and then recorded on sheet 40.

Before entering upon a detailed explanation of the circuit description, it might be well to present at this point the mathematical expressions employed for the evaluation of the Y and Z values earlier mentioned.

The value Y is evaluated in accordance with the following:

$$Y = -\frac{2XE_p[X+(K+1)H][X+(K+1)L]}{KE_n[X(H+L)+2(K+1)HL]}$$

The value Z is next evaluated in accordance with the following:

$$Z = -\frac{E_0 XY[X+(K+1)H]}{XE_p[X+(K+1)H]+KE_n YH}$$

In the above expressions H and L represent respectively the permissible high and low values of resistance. The remaining values X, K, $E_p$ and $E_n$ are taken from the chart shown in Fig. 7, which values were selected as the most practical commensurate with the specific measuring network employed. The value K is equal to X/S.

The circuit diagram is shown in Figs. 6a through 6g which when arranged in the manner shown in Fig. 5 constitute the wiring diagram of the card controlled testing machine. Referring to Fig. 6d, electrical energy is supplied to the machine upon closure of switch 10 which energizes the power supply 60, having the following output terminal voltages; namely, −48 v., −175 v., −270 v., −6 v., −6.3 v., +48 v., +55 v., +175 v. and +270 v. These voltages have direct connections to corresponding voltage terminals shown distributed throughout the wiring diagram. The direct connections are not shown in order to simplify the wiring diagram as much as possible.

For the sake of convenience it is believed that an explanation of the amplifier should be given first. Referring to Fig. 6e, the measuring amplifier 61 is comprised of three vacuum tubes; namely, 68, 122 and 126. Tube 68 is a double triode possessing high gain, high stability and low grid current. Tube 122 is a high voltage amplifier while tube 126 is a power amplifier.

Tube 68 is a double triode and is comprised of a right and a left section. The left section is comprised of a cathode 106, grid 67 and plate 100. The function of the left section is to maintain a constant voltage, preferably near ground, on the cathode. The voltage on the grid 67 is maintained at a fixed level, near zero, determined by potentiometer PT30 and capacitor 163. The circuit by which the grid 67 is controlled begins with potentiometer PT30, shown at the top of Fig. 6a, which is connected in series with a +175 v. source and a −175 v. source between which are also included a pair of divider resistances 81 and 82 each of 2.7 megohms resistance. From potentiometer PT30 the circuit then extends through line 62, through switch pole 8a, line 63, to terminal 63a. At this terminal a branch circuit to ground charges a 4 M. F. D. capacitor 163 while another branch circuit connected by line 64 extends to the grid 67 by means of line 64, terminal 65 and resistor 66 of 1000 ohms. Plate voltage is supplied to the plate 100 by means of a potentiometer 101 connected in a divider network beginning with +270 v., line 102, resistor 110 of 200,000 ohms, the potentiometer 101, resistor 111 of 300,000 ohms, line 112 to ground.

The right section of tube 68 is comprised of the cathode 106, control grid 107 and plate 108 connected to +270 v. by means of a plate load resistor 109 of 700,000 ohms, and line 102. The control grid is connected to resistor 113 of 1000 ohms, line 113a to input terminal 136. The input terminal is fed by two lines, namely, 137 and 138. The manner of controlling the input along these lines 137 and 138 will be explained hereinafter in the course of the description.

Tube 122 consists of a plate 120 connected to load resistor 121 of 270,000 ohms, a cathode suppressor grid 139, a screen grid 118, a control grid 140 and a cathode 117 connected to ground. The screen grid 118 is connected to a divider network including a resistor 119 of 68,000 ohms, and a resistor 115 of 33,000 ohms. Said network is connected between ground and the line 102 fed by +270 v. The control grid is connected to a resistor, of 132 megohms, which forms part of a resistance network coupling tubes 68 and 122. This coupling network begins with a line 114a which is connected to plate 108 of tube 68, and extends through resistor 114 of 1.8 megohms, resistor 132, line 133 to terminal 134. A capacitor 116 is connected across the resistor 114 and is used to overcome phase shift arising from interelectrode capacitance and distributive capacitance in the wiring.

Tube 126 comprises the cathode connected to −175 v., a plate 128 connected to an output terminal 104 and a control grid 125, the latter is connected to resistor 131 which forms part of a divider network coupling tubes 122 and 126. Said network begins with line 102 then follows through the resistor 121, resistor 123 of 1.8 megohms, the resistor 131 of 600,000 ohms, line 133 to terminal 134. In view of the divider network the grid 125 is maintaned at approximately −180 v. Parasitic oscillations are suppressed by means of a capacitor 129 and a resistor 130 connected to a capacitor 124, the latter serving the same function as does capacitor 116. The measuring amplifier has an open circuit gain of approximately 12,000. The input terminal 136 and the output terminal 104 are controlled in a manner to be described. A similar amplifier known as a timer amplifier is shown in block diagram form in Fig. 6d the operation of which will be discussed when the timer is described.

With power on the machine there will now be explained preliminary circuits concerned with balancing the amplifier prior to card feeding operations. The switch 8, earlier mentioned as a 4-pole switch, consists of switch poles 8a, 8b, 8c and 8d. Referring to the lefthand corner of Fig. 6a the switch poles 8a, 8b and 8c are shown in their normal or standby positions. Switch pole 8a provides a circuit path, previously explained, beginning with the potentiometer PT30, manipulated by means of the knob 7, to supply approximately a zero voltage to the input of the measuring amplifier. This circuit extends through switch 8a, line 63, line 64 to input terminal 65. Also capacitor 163 (Fig. 6d) is charged with the same voltage. By means of switch poles 8b and 8c, relays R1 and R2 are energized as follows: relay R1 is energized by a path beginning with +48 v., switch pole 8c, line 150, relay R1 to ground. Upon closure of relay R1e contact points a hold circuit is established for the relay R1 by means of a path beginning with ground and extending through relay R1e, relay R30d normally closed contact points, relay R34d normally closed contact points to +48 v. Other contact points controlled by the relay R1 are used in connection with the timer amplifier to be later described. Relay R2 is energized through switch pole 8b by a circuit path beginning with +48 v. and extending through switch pole 8b, line 70, relay R2 to ground. Upon closure of relay R2c contact points a hold circuit for relay R2 is established through ground, relay R2, relay R2c contact points, relay R31c normally closed contact points, line 71 to +48 v. Upon closure of relays R2a and R2b contact points, circuits are closed for balancing the measuring amplifier. What happens here is that a connection to ground is established to the input of the amplifier by way of a summing resistor 152 of 50,000 ohms, and a feed-back resistor 151 of 20 megohms is connected between the input and the output of the measuring amplifier. The feed-back circuit follows a path beginning with the output terminal 104 and extends along line 154, line 153, relay R2a normally open contact points, resistor 151, line 138, to the input terminal 136. The summing circuit follows a path beginning with the input terminal 136, line 138, resistor 152, relay R2b normally open contact points to ground. It is to be noted that the ratio of the summing resistor 152 to the feed-back resistor 151 is 400. This ratio provides the measuring network with a gain of 400. The network comprising the summing circuit and the feed-back circuit are not sufficient in themselves to zeroize the output of the amplifier. What is necessary is additional circuit means which will provide the necessary change to the input in response to an output voltage of the measuring amplifier. To this end there is provided a network under control of relay R3 shown in Fig. 6d. Included in this network is a capacitor 156, of .01 M. F. D. capacity, which is charged in accordance with the output voltage of the amplifier. The charging path for capacitor 156 begins with the output terminal 104, then extends along line 154, relay R3a normally open contact points, capacitor 156, resistor 157, relay R3b normally open contact points to ground. When the relay R3 becomes de-energized the contact points on relay R3a and relay R3b restore to the positions shown thereby connecting a capacitor 156 in a circuit beginning wih ground and extending through the relay R3a normally closed contact points, capacitor 156, resistor 157, the relay R3b normally closed contact points, line 158 to the capacitor 163. The effect of the path is to alter the charge on capacitor 163 to an extent depending upon the charge on capacitor 156. The change in the capacitance of capacitor 163 is impressed upon the input of the measuring amplifier to cause the output voltage to be reduced to zero or as close to zero as is practical. The circuit network under control of relay network R3 is not effective until after the first printing cycle to balance the measuring amplifier. Hence, the first printing cycle will not indicate any test result because of the fact that the first pair of cards entering the machine will not contain any circuit test data but only data relating to the identification of the test report. Following the preliminary run-in operation the measuring amplifier will be properly zeroized prior to the first test measurement.

*Card feeding and analyzing circuits*

As a preliminary to card feeding operations the switch 8 must be set to its run-in position. The setting of the switch 8 to the run-in position causes circuit paths previously completed through the associated switch poles 8a, 8b and 8c, located in the upper left-hand corner of Fig. 6a, to be broken. In addition switch pole 18, shown in Fig. 3, completes a circuit to the machine drive motor 11 which provides motive power to the main drive shaft 15. Upon closure of the feed control key 9, shown in Fig. 6a, two circuit paths are established. The first path is provided to balance the measuring amplifier in the event there is an extended delay in time between the operations of the switch 8 and the switch 9. The circuit to balance the measuring amplifier at this time extends from the potentiometer PT30, then follows line 62, line 62a through switch pole 9a to line 63 and then by means, previously described, to the balancing terminal 65 of the measuring amplifier and also to the capacitor 163. Switch pole 9b provides a circuit to energize start control relay R10. The circuit begins with ground and then extends through resistor 162, through switch pole 9b, relay R1g normally open contact points, relay R10 to −48 v. It is noted that relay R36c contact points are placed in parallel with the relay R1g contact points. The relay R36c contact points, controlled by the timer in a manner later explained, enables the start control relay R10 to be energized automatically while cards are in the machine.

Upon closure of relay R10a contact points a circuit is established to energize the card feed clutch magnet 19, the gripper control magnet 28 and the picker knife control magnet 23. The circuit begins with +48 v. and extends through line 69, relay R10a normally open contact points, hopper contacts, card feed clutch magnet 19 to ground. Also from the hopper contacts, a branch circuit extends through cam contacts 32 operated by an associated cam 31 located on the main shaft 15, shown in Fig. 3, the magnets 23 and 28 to ground. Cam 32 is timed to break on each revolution of shaft 15 to enable the card picker knife assembly 22 to operate every cycle during card feed operations thereby enabling, in conjunction with other card feed control circuits, two cards to be fed automatically on each feed operation following the entry of the first card into the second read station 29.

Upon closure of relay R10b contact points a circuit is completed to energize relay R11. The path begins with +48 v. and extends through relay R10b normally open contact points, relay R11 to ground. Upon closure of relay R11e contact points, a hold circuit for relay R11 is established from ground, through the relay R11, relay R11e normally open contact points, relay R30c normally closed contact points to +48 v. Other contact points of relay R11 are distributed through various card analyzing circuits in order to prevent the analysis of the cards while they are enroute to their respective card reading stations. The point at which the analysis of the cards begins is under control of a cards-in-place signal obtained upon the sensing of a one hole sensed in column 80 of a card 2 and a nine hole sensed in column 80 of a card 1. Upon the sensing of the one hole and the nine hole in cards 2 and 1, respectively, a circuit is effective to initiate the operation of the timer. The path of this circuit will be explained in conjunction with the timer. For the present it will suffice to note generally that column 80 of the card controls the operation of the timer and the energization of relay R30.

Returning to the card analyzing circuits in Fig. 6b, an explanation will be given of the manner in which circuits in the accounting machine are selected for the testing operation as well as other circuits controlled by test data punched in the cards. The circuits of the accounting machine are very briefly illustrated within rectangle 200. A particular circuit selected for a test operation is represented by a resistor 201 which is connected in series with a pair of control panel sockets 202 and 203 located in the control panel 3 of the accounting machine shown in Fig. 1. The control panel sockets 202 and 203 are connected by means of control panel wires 202a and 203a, respectively, to associated control panel sockets 202b and 203b located in the control panel 2 of the card controlled testing machine shown in Fig. 1. The circuit represented by resistor 201 is selected for test under control of a combination of card perforations comprising a "9" perforation in column 1 of card 1 and a "1" perforation in column 2 of card 2. Each pair of cards is thus punched with an appropriate pair of perforations to select a particular circuit for testing. As earlier explained columns 1 through 64 are set aside for the selection of circuits for test. In accordance with this arrangement, 768 circuits of the type represented by resistor 201 may be selected for test. Circuits of the type described are those through which circuit paths are completed without any alterations in the circuit per se. There are other circuits, in the accounting machine under test, which must be altered before the circuit path is completed. An example of this type is represented by a resistor 204 having in series therewith a normally open contact point 205a which is under control of an associated relay 205 forming a part of the accounting machine circuit. The circuit represented by resistor 204 and contact points 205a is connected to control panel sockets 206 and 207. The relay 205 is shown connected to control panel sockets 208 and 209. The latter control panel sockets along with control panel sockets 206 and 207 are part of the accounting machine control panel. The control panel sockets 206 and 207 are connected by means of control panel wires 206a and 207a to control panel sockets 206b and 207b. Current to the latter is supplied under control of a combination of card perforations comprising a "12" perforation in column 1 of card 1 and a "9" perforation in column 1 of card 2. Before a path can be completed through the circuit represented by the resistor 204 in series with the normally open contact points 205a, it is obvious that the contact points 205a must be closed. The closing of contact points 205a is effected by energizing relay 205 which relay is connected by means of control panel wiring 208a and 209a to control panel sockets 208b and 209b. The energization of relay 205 is under control of a single card perforation, in this particular instance a "9" perforation in column 65 of card 2. The circuit path for energizing relay 205 begins with ground and extends to line 210, socket 209b, wire 209a, socket 209, relay 205, socket 208, wire 208a, socket 208b, "9" segment 34 through the "9" perforation in column 65 of card 2, "9" brush 33, relay R4c normally open contact points to +48 v. The relay R4c normally open contact points are closed upon the energization of a relay R4 controlled by the timer in a manner to be later described. Circuits of the type described were earlier identified as enabling circuits each of which is under the control of a single card perforation punched in any of the columns 65 through 70.

Columns 71 through 74 are employed for the selection of a particular Y and Z values of resistance in accordance with the data punched in these columns of cards 2 and 1, respectively. Referring to Fig. 6b it is to be noted that of the card columns 71 through 74 only 71 and 74 are shown. As further seen in Fig. 6b each segment 33 is connected by an associated wire extending through a cable 211 to a specific resistance selecting relay shown in Fig. 6g. As further seen in Fig. 6g the relays numbering from R250 through R298 control the selection of a particular Z value of resistance while relays numbering R350 through R398 control the selection of a particular Y value of resistance. In both groups of relays it is to be mentioned that only certain ones are shown in order to avoid unnecessary duplication in the wiring diagram. A particular Y value or Z value of resistance is selected in accordance with the manner in which the card columns 71 through 74 are punched. Referring for the moment to Fig. 9, there is shown a portion of a card comprising columns 71 through 74. Across the top of the card portion there is a row of figures; namely, 1, 2, 4 and 8, each of which is assigned to a respective column 71 through 74 and each serves as a multiplier factor to be used in a manner presently described. Immediately to the right of the card there is a vertical row of values ranging from .01 to 10⁹, each value associated with one of the 12 index positions 12 through 9. The values shown are the values of resistance respectively assigned to each index point position 12 through 9 in column 71. For example, a "zero" perforation in column 71 selects a resistance value of 1 ohm, a "4" perforation in the same column selects $10^4$ or 10,000 ohms, etc. Corresponding perforations in column 72 select values of resistance which are twice the corresponding values associated with column 71. In this instance a "zero" perforation in column 72 selects a resistance value of 2 ohms, a "4" perforation in the same column selects a value of resistance of 20,000 ohms ($2\times10^4$) etc. In like manner corresponding perforations in columns 73 and 74 select resistance values which are respectively four times and eight times the corresponding values selected in column 71. In accordance with this arrangement any value of resistance Y or Z, ranging from .01 ohm to over 16,000,000,000 ohms may be selected. As a point of illustration, a resistance value of say 1.2482 megohms is selected in accordance with the following combination of perforations: a "6" in column 71, a "2" and a "5" in column 72, a "4" column 73 and a "3" in column 74.

Referring to Fig. 6g it is noted that each relay R250 through R298 is provided with an associated "a" contact point which is connected across a particular Z resistor. The Z resistors are numbered from 250' through 298'. It is further noted that the contacts 250a through 298a are connected in series. This series arrangement provides a shunt path across the entire series of the Z resistors 250' through 298'. The arrangement of relays and resistors just described is duplicated for the Y resistors 350' through 398' associated with relays R350 through R398. After a particular selection of Y and Z resistors has been effected they are then connected in the measuring circuit in a manner to be described.

The card analyzing means associated with column 75 of the second read station are connected by means of a cable 212 to code relays R20 through R24 shown in Fig. 6e. Five segments, 34, each corresponding to a particular index position, "5" through "1" are respectively connected each to an associated code relay R20 through R24. The purpose of each code relay R20 through R24, is to select within the testing machine a pair of resistors, earlier referred to as X and S, and to connect said resistors in the measuring circuit. The code relays are each provided with a plurality of normally open contact points located, in Fig. 6e, to the left of the code relays. The contact points of relay R20, are not shown. The X and S resistors are also shown in Fig. 6e, the former are identified as X5 through X2 while the latter are identified as S5 through S2. The values of X and S, the associated codes and code relays are shown in the chart of Fig. 7.

Referring to Fig. 6b, the columns 76 through 79 of the second read station are employed for sensing the test identification number punched in the cards. Column 77 and column 78 are shown as represented respectively by line portions 214 and 215 in turn connected respectively to relay R35e contact points and relay R35d contact points shown in Fig. 6f. The contact points R35e and R35d are connected to print magnets 219 and 218, representing respectively the hundreds and tens printing positions. The units position, printing magnet 217, is connected through relay R35c normally open points, line 216 to column 79. The thousandths position print magnet 220, is connected through relay R35f normally closed contact points, line 213 to column 76.

The 9 through 0 digit representing segments 33, of each column 76 through 79, are each connected to a corresponding digit representing segment forming a part of the well-known emitter device shown in block form in the right-hand corner of Fig. 6f. Four emitters are thus represented in block form and are identified as 490, 491, 492 and 493. The details of each emitter are well known in the art. Reference, however, is invited to the lower left-hand corner of Fig. 6f where there are shown limited details of an emitter 494 having nine spaced electrical segments 495 arranged in a semicircle and traversed by an electrical current carrying contact wiper 496. The associated wipers of the emitters 490 through 493 are connected to a circuit breaker 497 which is connected to +48 v. The circuit breaker provides cyclically timed impulses 9 through 0. The emitters are also timed to provide cyclically timed impulses, 9 through 0. The wipers of the emitters are driven in synchronism with the movements of the type bars 161 of the printing unit.

*The timer and the timer control*

The circuits constituting the timer are shown in Fig. 6c. Here there are shown a group of eight thyratrons T21 through T28 each associated with one of a group of relays R30 through R37. Each thyratron, for example, T21, includes a plate 400, a screen grid 401, a control grid 173, a cathode 406 and a heater element 407 therefor. The relays R30 through R37 are each connected in the plate circuit of its associated thyratron. One connection of each relay, R30 through R37, is connected to the plate of its associated thyratron while the other connection is connected in a circuit comprising a series arrangement of contact points, namely, R31a through R37a. The R37a contact point is further connected to relay R5a, normally closed, in turn connected to +55 v. This arrangement provides that once the operation of the timer is initiated upon the firing of the first thyratron, T21, each succeeding thyratron will fire in succession and the firing of the succeeding thyratron extinguishes the preceding thyratron.

The timer is uncaged, i. e., set into operation under control of an impulse derived from column 80. Said impulse arises as a result of a combination of perforations; namely, a "9" in card 1 and a "1" in card 2. The pulse issuing from column 80 follows a path beginning with +175 v. and simultaneously extending through a parallel path which includes: the sensing of the "9" perforation by way of resistor 176, "9" segment 34, "9" sensing brush 33, wire 170; and the sensing of the "1" perforation by a path beginning with +175 v. through line 411, resistor 174, "1" segment 34, wire 170, resistor 172 to the grid 173 of tube T21. The firing of T21 causes relay R30 to be energized to initiate operations of the timer.

Each thyratron of the timer is fired in succession to cause the associated relays R31 through R37 to be energized in succession. Each relay R31 through R37 is provided with associated contact points distributed throughout the wiring diagram. The function of each relay is as follows: relay R31 uncages the measuring amplifier, relay R32 renders the digital voltmeter effective, relay R33 causes the test result to be printed, relay R34 cages the measuring amplifier and renders the digital voltmeter ineffective, relay R35 causes the printing of the circuit identification number, relay R36 initiates a card feeding operation and relay R37 cages the timer.

Each of the above functions requires a certain time interval for the performance of the function. Each time interval is determined in advance and is a preliminary consideration in the initial setting-up procedure of the test. Having obtained the time value for each function, the timer is then controlled in accordance with the manner in which the timer control is connected.

The timer control is shown at the bottom of Fig. 6c and its function is to supply a preselected voltage for each function performed by the timer. The selected voltages are fed to a capacitor C6, shown in Fig. 6a, which is connected between the input and output terminals of a timer amplifier 61'. The output of the timer amplifier is thus controlled by this capacitor C6, which output is then passed on to the grids of the thyratron T22 through T28. The grids are each adjusted by an associated one of a group of potentiometers 421 through 427. The thyratrons T22 through T28 are thus controlled to fire in succession, the time interval between the firing of one thyratron and the next succeeding one being determined in accordance with the manner in which the pluggable controls of the timer control are connected.

Having set forth in general the manner in which the timer is controlled there will now be explained in greater detail the various related circuits. Referring to the timer control in Fig. 6c, there are shown a set of sockets S1 through S8 and a second set of sockets S1' through S8'. The former are connected to a resistor divider, one end of which is connected to —270 v. and the other end to ground. The sockets S1 through S7 provide the following negative voltages: 270 v., 167 v., 123 v., 66 v., 48 v., 14 v., 10 v. and 0 v. These voltages, with the exception of —270 v. and 0 v., are connected to the sockets S1' through S8' by means of plug wires 430 through 437. The sockets S1' through S8' are each connected to an associated one of a set of contacts R30b through R37b arranged in series. The R37b contact point is connected to a line 408 extending to resistor 409, shown in Fig. 6a, resistor 410 to capacitor C6. Referring to Fig. 6c, it may be appreciated that once the timer is uncaged and with relay R30 energized, a voltage of —123 v. is applied to capacitor C6 by means of the following circuit: beginning with socket S3, the circuit follows through plug wire 430, socket S1', R30b normally open, R31b normally closed, through R37b normally closed, line 408, resistor 409, resistor 410 to capacitor C6. Negative voltages of 167 v., 123 v., 140 v., 167 v., 66 v., 48 v. and 10 v. are successively applied in the order named to the capacitor C6 as the timer relays R31 through R37 are energized in succession.

The manner in which the capacitor C6 is coupled in the network associated with the timer amplifier will now be described. Referring to Fig. 6a, the timer amplifier 61' is shown in block form since it is the same as the measuring amplifier 61 shown in Fig. 6e. The timer amplifier 61' includes the input terminal 136', the output terminal 104' and a balance control terminal 65'. The control of amplifier 61' differs from the control of the measuring amplifier in two respects, namely, the feedback and the balancing. The balancing control is relatively simple since the problem of drift is of no or little practical concern. To this end a connection from terminal 65' to ground is sufficient. The network arranged between the input terminal 136' and the output terminal of the timer amplifier 61' is controlled by means of relay contacts R1a through R1d which are operated under the influence of the parent relay R1 earlier explained as being energized through the standby setting of switch pole 8a, shown in the left-hand corner of Fig. 6a. Prior to the initial feeding of cards into the testing machine, the relay R1 is energized to cause its associated contacts, particularly R1a through R1d, to be transferred. The effect of this is to charge the capacitor C6 to approximately —100 v. by means of the following circuit: beginning with terminal 412, which is at approximately —100 v., the circuit path then follows along line 413, relay R1c, normally open contact points, capacitor C6, relay R1b, normally open contact points to ground. The capacitor C6 is thus charged to approximately —100 v. during the time that the timer is caged. When the timer is uncaged, in the manner set forth, relay R30 is energized to cause an associated R30d contact point to open up the hold circuit to relay R1 (shown in Fig. 6a) to de-energize the same. Upon the de-energization of relay R1, the associated points R1a through R1d are shifted to the position shown in the wiring diagram to connect capacitor C6, between the input terminal 136' and the output terminal 104' of the timer amplifier. In addition, the capacitor C6 is also connected to the circuit extending to the timer control which applies successive negative voltages to the capacitor C6 during operations of the timer. The application of these successive voltages causes C6, initially charged to —100 v., to discharge. The rate of discharge of capacitor C6 is a function of the applied voltage. The circuit by which capacitor C6 is connected between the input and the output of the timer amplifier is as follows: beginning with the input terminal 136', the circuit follows through line 414, line 415, relay R1b normally closed, capacitor C6, relay R1c normally closed, an RC network comprising a capacitor 416 and a resistor 417, a wire 418 to the output terminal 104'. The RC network is employed as a parasitic suppressor. Also included in the timer amplifier network is a circuit which provides a gain of 400 during the caged time of the timer. This circuit connects a 20 megohm resistor 490 between the output and the input of the amplifier by virtue of a path from the output 104', wire 420, relay R1a normally open, resistor 419, wire 415, wire 414 to the input terminal 136'. Along with this circuit there is also a connection from the input terminal 136' through wire 414, wire 440, resistor 441 of 50,000 ohms to the capacitor C6. The ratio between resistor 441 and 419 is 400 which provides the network with a gain of the same value. A capacitor C10 is connected between ground and a resistor 443 in turn connected to the amplifier output line 442. This circuit stabilizes the voltage on the line 442 during the period of contact operation of contacts R1d.

During operation of the timer, the voltage output of the timer amplifier is a function of the discharge of capacitor C6, the discharge rate depending upon the voltage supplied by the timer control. The output voltage of the timer amplifier is passed along line 442 to which are connected the potentiometers 421 through 427, each of which is connected to an associated control grid of the thyratrons T22 through T28 of the timer. Referring to Fig. 6c, each potentiometer, 421 through 427, has a resistance value of 200,000 ohms and is connected to a divider, one end of which is connected to a control grid whereas the opposite end thereof is connected to +270 v. Since the grid circuits for all thyratrons T22 through T28 are the same, a typical circuit for one should suffice. As an example, the control grid circuit to thyratron T22 begins with line 442, and extends through potentiometer 421 to a divider comprising resistors 254 and 255. The former is connected to +270 v. while the latter is connected to the control grid 256. The resistors 254 are each of 820,000 ohms. The resistors 255 vary with each control circuit. Beginning with thyratron T22, the associated resistor 255 has a value of 1.15 megohms. Each succeeding resistor 255 connected in the control grid circuits for the remaining thyratrons T23 through T28 have the following resistance values (in megohms): 1.12, 1.10, 1.08, 1.05, 1.02 and 1. The potentiometers 421 through 427 are adjusted so that each associated thyratron, T22 through T28, fires in succession. Each control grid is thus biased so that successive negative potentials of 90 v., 80 v., 70 v., and so forth to 30 v. on the output line 442 will fire in succession the thyratrons T22 through T28.

The timer is caged by extinguishing all of its thyratrons T21 through T28 whereby the associated relays R32 through R37 are accordingly de-energized. This is accomplished by opening up the relay R5a normally closed contact points which is wired in series with the relay R37a normally open contact points. The circuit controlling the relay R5, shown in Fig. 6d, is energized as follows: beginning with +48 v. the circuit extends through the relay R5, capacitor C4, relay R1f normally open contact points to ground. The relay R1f normally open contact points are closed upon the energization of the relay R1, shown in Fig. 6a, by means of a circuit path beginning with +48 v. and extending through relay R37c normally open contact points, through the relay R1 to ground. The relay R37c normally open contact points are closed upon the energization of relay R37, the latter being wired in the plate circuit of the last thyratron T28 in the timer. Returning to the relay R5 circuit in Fig. 6b, the capacitor C4 permits immediate energization of the relay R5, the latter remaining energized until the capacitor is charged whereupon relay R5 de-energizes. Resistor 511, wired in parallel with said capacitor C4, is used for discharging said capacitor.

*The measuring circuit*

Upon the firing of thyratron T22 and the energization of relay R31, the measuring circuit is uncaged, i. e., set into operation to measure the resistance value of a particular circuit selected in the accounting machine. Let it be assumed that the circuit as represented by the resistor 201, in Fig. 6b, is selected in the manner previously explained. Let it be further assumed that the precalculated value of this circuit is 176.5 ohms with a permissible acceptable + or − tolerance of 5.5 percent. The highest acceptable value of resistance may then be 185.7 ohms. In accordance with mathematical expressions, earlier shown, appropriate Z and Y values of resistances are derived, respectively, 61.340 megohms and 5.7808 megohms. These values are then punched, in accordance with the code earlier explained and shown in Fig. 9, in columns 71 through 74 of a particular pair of cards 1 and 2. In Fig. 6g the Y value of resistance is thus selected between terminals 444 and 445 while the Z value of resistance is selected between the terminals 446 and 447. Both of these values are then connected in the measuring network in a manner to be explained. In accordance with the chart of Fig. 7, code 2 is assigned to the circuit under test. Accordingly, code 2 appears in column 71 of card 2. As a result of this code, relay 23 is energized to select appropriate X and S resistance values respectively $10^5$ ohms and $10^4$ ohms. Voltages of +175 v. and −175 v. are connected in the measuring network in a manner to be described. In accordance with the energization of relay R23, the associated R23a through R23e contact points are closed to complete circuits in the measuring network to effect the resistance measurement of the circuit under test (the d contact points associated with the code relays are not used in this case).

The Z value of resistance is connected between the input and output terminals of the measuring amplifier. Referring to Fig. 6e, the circuit begins with the output terminal 104 and extends through line 154, line 154a, line 448, terminal 447, the selected Z value of resistance, terminal 446, line 451, relay R23c contact points, line 137 to the input terminal 136.

The Y value of resistance is connected between the input of the measuring amplifier and a supply voltage of +175 v. Beginning with +175 v. the circuit extends through line 449, relay R23a contact points, line 450, terminal 444, the selected Y value of resistance, terminal 445, terminal 446, line 451, relay R23c now closed contact points, line 137 to the input terminal 136 of the measuring amplifier.

The X and S resistors are connected in series between the input of the measuring amplifier and a source of −270 v. The circuit is traceable as follows: beginning with the input terminal 136 the circuit extends through line 137, relay R23e now closed contact points, X4, terminal 551, resistor S4 to −270 v.

The circuit in the accounting machine selected for test is connected to a path extending from the terminal 551, line 453, relay R23b now closed contact points, line 452, relay R4b now closed contact points, column 2 in the second read station, brush 33 corresponding to the 1 index position, the "1" perforation in card 2, segment 34, socket 202b, plug wire 202a, socket 202, resistance 201 representing the circuit under test in the accounting machine, socket 203, plug wire 203a, socket 203b, segment 34 corresponding to the 9 index position of column 1 of the first read, the "9" perforation in card 1, brush 33 to ground.

In accordance with the above network the measuring amplifier provides an output of +100 v. for a measured resistance equal to the preassigned high limit of resistance. On the other hand a −100 v. is supplied by the amplifier should the measured value of resistance be equal to the preassigned low value of resistance. Should the measured value of resistance be of some value between the preassigned high and low values, the output of the measuring amplifier would provide some voltage value between +100 v. and −100 v. In Fig. 8 a chart is shown as an illustrative example of the possible ranges of resistance between high and low values for the circuit whose precalculated value of resistance is 176.5 ohms having permissible tolerance of + or − 5.5 percent. The percentage expressed in terms of resistance provides a high value of 185.7 ohms and a low value of 166.3 ohms. Intermediate values of resistance are shown calibrated in steps of 10 percent of full scale, which values are further associated with positive and negative digit values 1 through 9. These digit values are shown on the left side of the chart. The positive digit values 1 through 9 are shown in the tens column while the negative values 1 through 9 are shown in the hundreds column. When a 1 appears in both the tens and hundreds column it is an indication of a circuit whose measured resistance is very close to the preassigned value of resistance. A zero in the units position indicates a measured value of resistance which is beyond the permissible + tolerance. A zero in the thousandths position indicates a measured value of resistance which is beyond the permissible negative tolerance value of resistance.

The digital voltmeter

Referring to Fig. 6f there are shown only portions of the entire circuit constituting the digital voltmeter. For example, thyratrons T1, T2 and T9 including associated relays R40, R41 and R48, constitute the portion of the circuit wherein the negative digit values respectively 9, 8 and 1 are represented. The circuit employed for representing the negative values 7 through 2 are not shown. In like manner thyratrons T11, T12 and T19 together with their associated relays R50, R51 and R58 constitute the circuit wherein positive digit values respectively 1, 2 and 9 are represented. The circuits for representing the positive values 3 through 8 are not shown. Thyratron T10 and its associated relay R49 are used to represent a measured resistance value which is very close to its preassigned resistance value. Thyratron T20 and its associated relay R59 are used to represent a zero value.

The thyratrons employed in the digital voltmeter are of the type employed in the timer. Each thyratron is similar in structure and operation, hence an explanation of one should be sufficient for all the thyratrons. Thyratron T1 for example, includes a plate 470, a screen grid 471, a control grid 472, a cathode 473, and a heater element 474 therefor. The screen grid 471 is connected to a supply of +55 v. by means of a path including a resistor 475 and line 476. The cathode 476 is connected to ground by way of line 477. The control grid 472 is connected to a circuit which begins with the cathode 474 and extends through a capacitor 478, resistor 479 of 1 megohm to a terminal 480. This terminal provides a positive voltage determined by a divider, one branch of which includes a resistance 481 of 820,000 ohms connected to +270 v. while the other branch is connected to the output line 154 of the measuring amplifier 61 and includes a resistor 482 of .18 megohm and a potentiometer 483 of 180,000 ohms. The latter is adjusted to some value which will cause its associated thyratron T1 to fire when the output voltage on line 154 has a negative potential between —100 v. and —90 v. The next succeeding potentiometer associated with the thyratron T2 is accordingly adjusted so as to cause said thyratron T2 to fire when the output voltage on line 154 has a negative voltage between —90 v. and —80 v. The next succeeding thyratron T3 is controlled to fire when the output on line 154 is between —80 v and —70 v. Each succeeding thyratron T4 through thyratron T9 is biased to a 10 volt range below the preceding range of voltage on line 154. By virtue of this arrangement the above negative voltage ranges are translated to a specific digit value —9 through —1. In like manner, thyratrons T11 through T19 are employed to represent positive digit value +1 through +9, respectively. The potentiometer associated with the thyratron T11 is adjusted to fire the latter when the output voltage on the line 154 is between +10 v. and +20 v. The potentiometer associated with the thyratron T19 causes the latter to fire when the output voltage on the line 154 is between +90 v. and +100 v. Thyratron T10 is controlled to fire when the output voltage on the line 154 is between —10 v. and +10 v. Thyratron T20 fires when the output voltage on the line 154 is above 100 v.

As may be appreciated from the circuit diagram the thyratrons T1 through T20 each control an associated relay R40 through R59. Said relays are serially connected in a circuit supplied by a source of +55 v. Included in this circuit are the normally closed "a" contact points associated with each relay R41 through R59, and a relay R6b normally open contact point.

The relay R6b normally open contact point is controlled by its associated relay R6, shown in Fig. 6d. As shown therein, the relay R6 is energized upon the closure of relay R32c normally open contact points, which points are closed upon the energization of the parent relay R32 controlled by the timer in the manner earlier described under timer circuits. In the sequence of operation, the voltage on line 154 is established prior to the closure of the relay R6b contact points. If, for example, the voltage on the line 154 is at some established value, say —90 v., it follows that thyratrons T2 and T3 will fire immediately upon the closure of the relay R6b contact points. Only one thyratron, namely, T3, will remain energized in view of the series manner in which the associated relay R41 through R59 are wired. The effect of this series arrangement is to provide final circuit path to only one thyratron even though more than one were initially fired upon the closure of relay R6b contact points.

Printing circuits

The printing circuits are shown in the bottom half of Fig. 6f, here it may be appreciated that only a few representative circuits are shown in order to avoid unnecessary duplication in the wiring. The printing circuits include the four printing control magnets, 217, 218, 219 and 220. Each is connected to an associated relay R35c through R35f in the manner shown and earlier described. To effect the printing of a circuit identification number, a typical circuit for printing a single digit in the units position thereof is traceable as follows: referring to the lower right-hand corner of Fig. 6f, the circuit begins with +48 v. and extends through CB 497, emitter 490, cable 498 to column 79 (Fig. 6b), segment 33, the perforation in the card, brush 33, wire 216 back to relay R35c normally closed contact points in Fig. 6f, to the units printing control magnet 217 to ground. Circuit paths for the remaining digits in the test identification number following circuit paths similar to the one traced except that they are directed to the tens, hundreds and thousandths printing positions respectively. In printing the results of the test measurement the relay R35 is de-energized.

The printing of a significant digit in response to a test measurement is effected by energizing either the tens print control magnet 218 or the hundreds print control magnet 219 depending upon whether the test result is positive or negative. The circuits associated with the printing of the test results include the emitter 494 and associated b and c contact points controlled by the associated relays R40 through R49. Here it must be mentioned that only a few representative circuits are shown. A typical circuit for the printing of a negative test result, the digit 8 for example, is as follows: beginning at the lower left-hand corner of Fig. 6f the circuit begins with +48 v. and extends through a CB 499, timed to provide differentially timed pulses 9 through 0, wiper 496, 8 segment on the emitter 494, relay R41c normally closed contact points, line 501, switch S. G. R. now closed to the print control magnet 219. The energization of the latter causes the printing of the value 8 in the hundreds position. The switch S. G. R. stands for Suppress Good Results, it is set to an open position in the event it is desired to suppress test results in the tens and hundreds printing positions.

In the printing of a positive value, for example a 9, the circuit path is under control of a relay R58c normally open contact points. In this instance the circuit is traced beginning with ground and extending through the tens print control magnet 218, line 504, through the switch S. G. R., line 505, relay R58c normally open contact points to the 9 segment of emitter 494 by means of a connection not shown, wiper 416, CB 499 to +48 v.

When the measured resistance value is relatively close to its precalculated value the digit 1 is caused to be printed in both the tens and hundreds printing positions. The circuit operation is initiated under the control of thyratron T10 which when fired in response to the voltage, between +10 v. and —10 v., on line 154, causes relay R49 to be energized. Upon the closure of relay R49c normally open contact points, a 1 is caused to be printed in the tens position by means of a circuit path beginning with the 1 segment on the emitter 494 and extending through line 506, line 507, relay R49c contact points, line 508, through the switch S. G. R., line 504, through the tens print control magnet 218 to ground. Simultaneously upon the closure of relay R49d a 1 is also printed in the hundreds position by means of the following circuit. Again beginning with the 1 segment on emitter 494 the circuit extends through line 506, line 507, line 509, relay R49d normally open contact points, line 501, to the switch S. G. R., through the hundreds print control magnet 219 to ground.

When the measured resistance is above the high limit, a zero is caused to be printed in the units position. The circuit operation is initiated by energizing thyratron T20 in response to a positive voltage in excess of a 100 v. impressed on the output line 154. Upon the energization of thyratron T20, relay R59 is energized. Upon closure of relay R59c normally open contact points, a circuit is established beginning with the zero segment on emitter 494 and extending through relay R35g normally closed contact points, relay R12a normally closed contact points, relay R59 normally open contact points, through the units position print control magnet 217 to ground.

When the measured resistance is beyond the low limit, a voltage greater than —100 v. is caused to be impressed on the output line 154. Said voltage is ineffective to fire any thyratron in the digital voltmeter. Accordingly, a circuit is established to energize the thousandths position print control magnet 220. This circuit is traceable as follows: beginning with ground the circuit extends through the thousandths position print control magnet 220, through a series of normally closed b contact points associated with the relays R59 through R40, relay R35g normally closed contact points, the zero segment on said emitter 494, wiper 496, CB 499 to +48 v.

The foregoing explains resistance measuring operations based upon the assumption that resistance due to insulation leakage is negligible and therefore has no appreciable effect upon the validity of the output voltage derived by the measuring network.

The following explains measuring operations dealing with resistance measurements based primarily on insulation leakage current. For this operation a separate test deck of cards is employed in which a pair of cards is employed for the selection of a particular circuit for insulation testing. It must be mentioned that the use of a pair of cards is merely one of choice prompted only by capacity requirements. In preparing the test deck, a particular pattern of perforations must be provided in each pair of cards in order to connect but one terminal of the particular circuit to a hot line, namely, wire 452, while the opposite terminal thereof remains unconnected. The remaining circuits in the accounting machine are connected, one terminal of each to ground under control of a pattern of perforations one each for said remaining circuits. In view of this arrangement a leakage path may be established to the measuring network whereby an output voltage is provided in accordance with the measured resistance of said leakage path. Referring to the schematic drawing in Fig. 10, there are shown resistances 201, 201a and 201b, the first of which represents the circuit selected for insulation testing, resistor 201a is another typical circuit whereas resistor 201b is used to represent the remaining circuits in the accounting machine. In accordance with the above procedure the circuits of the accounting machine, represented by 201a and 201b, are connected one terminal of each to ground by means of appropriate perforations in the card. The opposite terminals of these circuits remain unconnected. Under the control of a particular perforation the circuit 201 is connected, one terminal thereof, to the hot line 452 which extends into the measuring network. Leakage resistance is shown represented by a resistor 201c which, by way of example, exists between the circuits 201 and 201a. By virtue of this arrangement a current path is established beginning with line 452, and extending through relay R4b normally open contact points, analyzing brush 33, the particular circuit designating perforations in the card, segment 34, socket 202b, control panel wire 202a, socket 202, resistor 201 which represents the circuit selected for the insulation test, the leakage path represented by resistor 201c, socket 521, control panel wire 521a, socket 521b, segment 34, through the perforation in the card, analyzing brush 33 to ground.

In addition to the pattern of perforations described, the card is further perforated with an appropriate circuit identification number in columns 71 through 74, an insulation test code 4 in column 75, and appropriate codes for designating a set of Y and Z values of resistance in columns 76 through 79. The latter code is based upon some arbitrary value of leakage resistance having certain positive and negative tolerance values. These high and low values are evaluated in a manner earlier described to provide corresponding Y and Z values of resistance. In accordance with code 4 appropriate X and S values of resistance are selected and combined in the measuring network in the manner described. The measuring network functions in the same manner as before and provides appropriate positive or negative voltages which in turn are translated into positive or negative digit values by means of the digital voltmeter. Leakage resistance measurements which are beyond the high and low limits are appropriately recorded in the units and thousandths printing positions, a "1" digit being used in this case to distinguish over the zero previously used to identify measured resistance values beyond the high and low limits of resistance. The manner whereby a 1 is printed in the units or thousandths printing positions is under control of a "2" perforation appearing in column 75 of card 1. When the "2" perforation is recognized by its associated analyzing brush a circuit is completed to energize relay R12, shown in Fig. 6f. The energization of the latter causes the associated relay R12a contacts to transfer the control of the printing circuit from the zero segment on the emitter 494 to the 1 segment on said emitter.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention therefore, to be limited only as indicated by the scope of the following claims.

What is claimed is:

1. In a machine for testing a plurality of terminated circuits; control record means bearing control designation groups pertaining respectively to the terminated circuits to be tested; means for sensing the control designation groups in succession; each group of control designations including designations for selecting an individual circuit to be tested, and other designations; an array of networks including a feed-back network, each including selectable impedances; means controlled by said other designations for selecting impedances appropriate to the terminated circuit selected by the related circuit selecting designations; said selecting means including means to connect the terminated circuit and the impedance networks selected in a common circuit network; a summing amplifier having an input connected to said common circuit network and an output; said selecting means including means to connect said feed-back network between the input and output of said summing amplifier; and manifesting means connected to said output.

2. In a machine for testing a plurality of socket terminated circuits; control record means bearing control designation groups pertaining respectively to the socket terminated circuits to be tested; each group of control designations including designations for selecting an individual circuit to be tested, and other designations including a test initiating designation; an array of networks including a feed-back network, each including selectable impedances; means controlled by said other designations for selecting impedances appropriate to the socket terminated circuit selected by the related circuit selecting designations; said selecting means including means to connect the socket terminated circuit and the impedance networks selected in a common circuit network; a summing amplifier having an input connected to said common circuit network and an output; said selecting means including means to connect said feed-back network between the input and output of said summing amplifier; said common circuit network including a normally inoperative test switch; and means under control of said test initiating designation for rendering said test switch operative whereby a test is effected and an output voltage is accordingly impressed on said output.

3. A machine as in claim 2 for testing socket terminated circuits each having a predetermined range of resistance; said other control designations further including range designations; means controlled by the latter for selecting appropriate impedances in said array of networks and said feed-back network; said summing amplifier impressing a normalized output voltage within a fixed range on said output in response to a resistance test on a selected socket terminated circuit.

4. A machine as in claim 3 further characterized by the provision of manifesting means connected to said output whereby normalized manifestations are exhibited in response to impressed normalized voltages.

5. A machine as in claim 4 characterized by the fact that said manifesting means is a digital voltmeter having positive digit representing elements responsive to a portion of said normalized output voltage range and negative digit representing elements responsive to the remaining portion of said normalized output voltage range.

6. In a machine for testing a plurality of pluggable circuits and recording in rapid succession appropriate normalized values for each tested circuit exhibiting an output within a normalized range; control record means bearing control designation groups pertaining respectively to the pluggable circuits to be tested; each group of control designations including designations for selecting an individual circuit to be tested, other designations including range designations, and a test initiating designation; an array of networks, each including selectable impedances and range impedances; means controlled by said other designations for selecting impedances appropriate to the pluggable circuit selected by the related pluggable circuit selecting designation; means controlled by said range designations for selecting appropriate range impedances for said selected pluggable circuit; said selecting means including means to connect said selected pluggable circuit and the impedance networks selected in a common circuit network; a summing amplifier having an input connected to said common circuit network and an output upon which is impressed a normalized voltage within a fixed range; means connected to the amplifier output for translating normalized output voltages into normalized digit representations; recording means for recording the normalized digit representations, said recorded representations expressing (in a convenient manner) the quality of a tested circuit in relation to its precalculated value; a normally open test switch interposed in said common circuit network; and means under control of said test initiating designation for operating said test switch whereby a test is effected and an immediate recording is made thereof.

7. A machine as in claim 6 characterized by the fact that said recording means includes means for recording a test exhibiting an output voltage which is either above or below the normalized output voltage range.

8. In a machine for testing pluggable circuits each including at least one normally inoperative switch, the latter being controlled by associated pluggable switch control means; control record means bearing control designation groups pertaining respectively to the pluggable circuits to be tested, each group of control designations including designations for selecting an individual pluggable circuit to be tested for resistance and other designations including test initiating designations and designations for selecting a pluggable switch control means for operating said normally inoperative switch in the related pluggable circuit whereby a continuous path is established through the latter; an array of networks including a feed-back network, each including selectable resistances; means controlled by said other designations for selecting resistances appropriate to the resistance of the related pluggable circuit; said selecting means including means to connect the related pluggable circuit and the impedance networks selected in a common circuit network; a summing amplifier having an input connected to said common circuit network and an output; said selecting means including means to connect said feed-back network between the input and output of said summing amplifier; said common network including a normally inoperative test switch; and means under control of said test initiating designation for rendering said test switch operative whereby a test is effected and an output voltage is accordingly impressed on said output.

9. In a machine for testing and recording the resistance of a plurality of terminated circuits; control record means bearing control designation groups pertaining respectively to the terminated circuits to be tested; each group of control designations including designations for selecting an individual terminated circuit to be tested for resistance, and other designations including a test initiating designation; controlled means for feeding said control record means; an array of networks, each including selectable resistances; means controlled by other designations for selecting resistances appropriate to the resistance of the related terminated circuit; said selecting means including means to connect the terminated circuit and the impedance networks selected in a common circuit network; a summing amplifier having an input connected to said common circuit network and an output connected to said common circuit network; controlled manifesting means connected to said output; recording means connected to said last-named means; said common circuit network including a controlled timer switch; and a timer under control of said test initiating designation for controlling the feeding, testing, manifesting and recording operations of a succession of tests.

10. A machine as in claim 9 characterized by the fact that said timer includes a plurality of voltage responsive signaling devices each assigned to control a specific function, and each having an output and an input adjusted to a particular voltage; a timer amplifier having an input and an output, the latter being connected to each of said adjustable inputs; a capacitor connected between the input and the output of said timer amplifier; means for charging said capacitor prior to each test; a circuit under control of said timer; and a plurality of voltage sources, each applied one at a time under control of said circuit to the input of said timer amplifier whereby the rate of discharge of said capacitor determines the time interval within which the output of the timer amplifier attains a voltage proportional to the applied input voltage.

11. In an automatic card controlled testing machine the combination with a plurality of terminated circuits, each to be selected and tested one at a time; of sensing means for sensing a plurality of cards in succession; each card bearing first impedance selecting designations, second impedance selecting designations, a connection control designation, a circuit selecting designation, and a test initiating designation; a summing device having input means and output means, the latter manifesting a voltage in response to a completed test; voltage sources; a plurality of first selectively connectable impedances connectable between said input and said output, the former selected in accordance with the sensing of said first impedance selecting designations; a plurality of second selectively connectable impedances, each connectable between one of said voltage sources and said input, the former selected in accordance with the sensing of said second impedance selecting designations; a plurality of third impedances, each connectable between another of said voltage sources and said input; said connection control designation controlling one of a plurality of connection control means, each having a plurality of connectors, the latter effecting connections respectively to said plurality of first selectively connectable impedances, to said plurality of second selectively connectable impedances, and to one of said plurality of third impedances; a terminated circuit selected in accordance with said circuit selecting designation upon the sensing of the latter by said sensing means; said sensing means connectable to said one of said plurality of third impedances in a circuit including a normally inoperative test switch; and means rendering said test switch operative upon the sensing of said test initiating designation whereby said selected terminated circuit is tested and a voltage is manifested on said output.

12. A machine for testing the insulation resistance of each of a plurality of pluggable circuits; voltage sources; said pluggable circuits connectable between said voltage sources in a common network; record control means, each bearing a test initiating designation and a pattern of designations, said pattern connecting all of said circuits, except one, in said common network to one of said voltage sources, while connecting said excepted circuit to the other of said voltage sources whereby said excepted circuit is placed in an insulation resistance path with each of the remaining circuits a summing amplifier having an input connected to said network and an output, a feed-back circuit connected between said input and said output; a control circuit interposed in said common network; said control circuit including manifesting means responsive to an insulation resistance test, and a normally open test switch; and means under control of said test initating designation for operating said test switch whereby an insulation resistance test is effected and the results thereof manifested by said manifesting means.

References Cited in the file of this patent

UNITED STATES PATENTS

| | | |
|---|---|---|
| 2,329,491 | Sulzer | Sept. 14, 1943 |
| 2,468,398 | Griffin | Apr. 26, 1949 |
| 2,499,720 | Boynton | Mar. 7, 1950 |